March 1, 1938. C. A. DESIMONE 2,110,106
FLUID DISPENSING APPARATUS
Filed April 30, 1937 2 Sheets-Sheet 1
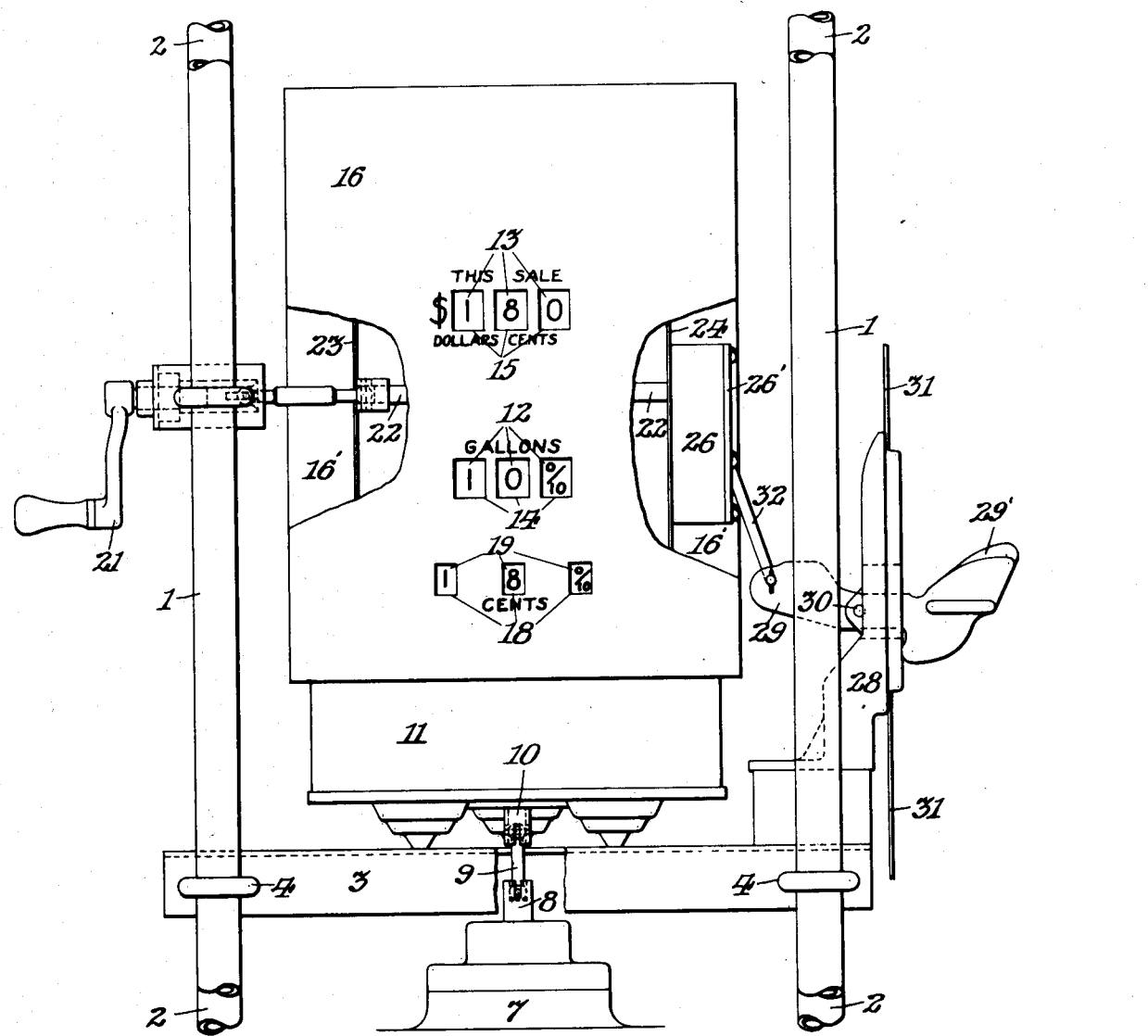
FIG. I.
INVENTOR:
CORNELIUS A. DESIMONE, March 1, 1938. C. A. DESIMONE 2,110,106
FLUID DISPENSING APPARATUS
Filed April 30, 1937 2 Sheets—Sheet 2
FIG. II.
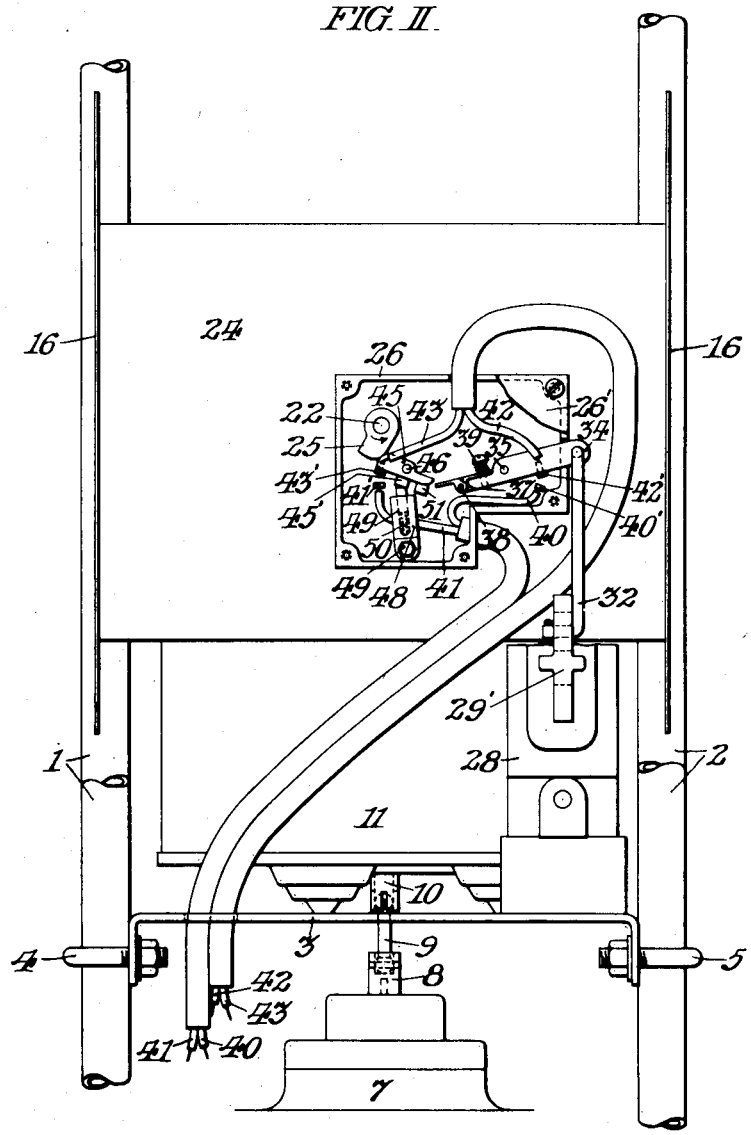
INVENTOR:
CORNELIUS A. DESIMONE,
BY Patented Mar. 1, 1938

2,110,106

UNITED STATES PATENT OFFICE 2,110,106

FLUID DISPENSING APPARATUS

Cornelius A. Desimone, Cynwyd, Pa., assignor to John Wood Manufacturing Company, Inc., Conshohocken, Pa., a corporation of Delaware Application April 30, 1937, Serial No. 139,886

8 Claims. (Cl. 221—95)

My invention is particularly applicable to metering pumps for dispensing gasoline. Such apparatus includes a meter through which the liquid is forced by a pump from a supply tank to and through a dispensing hose. Said pump is actuated by an electric motor which is energized and deenergized by manual operation of an electric switch by the operator, and said meter is operatively connected with an indicator, for manifesting by numerals the quantity of liquid dispensed in gallons and fractions of a gallon. Of course, in order to insure dispensation of a given quantity at any operation, it is necessary that the indicator be at its zero position at the beginning of each dispensing operation. Therefore, such apparatus includes what is termed "setback" mechanism, ordinarily manually operable by a crank exterior to the apparatus casing. However, apparatus of that simple character may be used to cheat the customer if the operator either wilfully or unintentionally fails to set the indicator back to its zero position before beginning a dispensing operation. Therefore, it is ordinary practice to provide such a metering pump with automatically operative locking mechanism for positively preventing the initiation of any dispensing operation until the indicator is placed in its zero position. However, such mechanism is complicated and correspondingly costly. Therefore, it is the purpose and effect of my invention to provide an electrical circuit for the pump motor with two electrical switches, in series, one operatively connected with the ordinary hook lever, used as a support for the dispensing hose when the latter is in idle position; the other switch being operatively connected with said setback mechanism; the relation of the parts being such that the indicator must be set to zero position before the second switch is automatically closed to complete the circuit, when the first switch is manipulated to close it.

My invention includes the various novel features of construction, arrangement, and method of operation hereinafter more definitely specified.

In said drawings:

Fig. I is a fragmentary front elevation of a metering pump of what is known as the "curbstand" type for dispensing gasoline and including a convenient embodiment of my invention.

Fig. II is a fragmentary elevation of said apparatus as seen from the right hand side of Fig. I.

In said figures; the apparatus is mounted in a housing which is adapted to be fixed on a pavement or platform at a curb or driveway and includes a base member and top member, not shown, connected at their corners by four cylindrical standards. The pair at the front are indicated at 1 and the pair at the back at 2. Said standards are cross connected by transverse frame members, only one of which is indicated at 3 in the drawings, connected with said standards 1 and 2 by the U-bolts 4 and 5.

The meter mechanism which is inclosed in the casing 7, only the upper portion of which is shown in the drawings, includes the shaft 8 which is turned by the fluid passing through the meter. Said shaft 8 is connected by the coupling 9 with the shaft 10 depending from the casing 11 which contains indicating mechanism comprising two series of wheels respectively indicated at 12 and 13 in Fig. I. Each of said wheels is decimally numbered at its circumference and the numbered surfaces of said wheels 12 and 13 are respectively presented at windows 14 and 15 in the indicator face plate 16 as shown in Fig. I which, with its appurtenances is duplicated on the opposite side of the apparatus as indicated at 16' in Fig. II.

In the form of my invention chosen for illustration, the indicating mechanism is in fact a computing registering mechanism which includes a series of decimally numbered wheels 18 which may be manually set to display at windows 19 in said face plates 16 and 16' numbers representing the price per gallon of gasoline to be dispensed. As indicated, the price is eighteen cents but the right hand wheel 18 represents tenths of a cent and might be set to represent from one to nine tenths of a cent. The right hand wheel 12 shown in Fig. I represents tenths of a gallon. The two other wheels 12 represent whole gallons, and ten gallons are indicated. The two right hand wheels 13 represent cents and the left hand wheel 13 represents dollars, and $1.80 is shown as the total value of the ten gallons at eighteen cents a gallon which have been dispensed.

Mechanism to set back to zero position the numbered wheels 12 and 13 at the termination of each operation includes the crank 21. Said crank 21 is operatively connected to manually turn the setback shaft 22 by intermediate coupling members indicated in Fig. I. Said shaft 22 is mounted to turn in bearings supported by the opposite side plates 23 and 24 of the indicator mechanism casing 11 and, the right hand end thereof with respect to Fig. I has rigidly connected therewith the cam 25 shown in Fig.

11, which is inclosed within the switch box 26 supported by said casing plate 24 and conveniently provided with the removable cover plate 26' which is shown in place in Fig. I but omitted in Fig. II to disclose the switch mechanism.

Said transverse member 3 of the housing supports the bearing bracket 28 in which the hook lever 29 is pivoted on the pin 30. The entire housing above described is inclosed in a sheet metal casing including four panels upon the respective sides thereof, only a fragment of one panel being indicated in Fig. I at 31. The right hand end 29' of said hook lever 29 projects exterior to said sheet metal housing casing 31 and is hook shaped to support the dispensing hose and the ordinary valve controlled nozzle at the dispensing end thereof. The drawings show said lever 29 and 29' in the position to which it is depressed by the weight of the hose and nozzle when placed thereon in idle position. The inner end of said lever 29 is pivotally connected with the right angularly bent lower end of the link 32. The upper end of said link 32 is pivotally connected with the right hand end of the main switch lever 34 which is fulcrumed on the pivot stud 35 fixed in said switch box 26. Said main switch lever 34 carries the tappet plate 37 which is pivoted thereon at 38 and normally stressed to the position shown in Fig. II by the spring 39 and is operative as hereinafter described.

The two electric conductors 40 and 41 supply electrical energy for operation of the pump motor which is not shown but which is provided with the two electric conductors 42 and 43. Said supply conductors 40 and 41 are connected respectively with terminals 40' and 41' which are fixed in stationary position in said switch box 26 as shown in Fig. II. Said motor conductor 42, which is flexible, is connected with the terminal 42' which is fixed on said main switch lever 34 and movable therewith to and from contact with said supply terminal 40'. Said motor conductor 43, which is flexible, is connected with the terminal 43' which is fixed on and movable with the auxiliary switch lever 45, which is fulcrumed on the pivot stud 46 fixed in said switch box 26. Said auxiliary switch terminal 43' is thus arranged to be carried to and from contact with the stationary supply terminal 41' by said auxiliary switch lever 45.

The toggle lever 48 is fulcrumed on the tap bolt 49 in said switch box 26 and carries the plunger 49' which is continually stressed upwardly by the spring 50 in said lever 48 so as to bear upon the toggle arm 45' of said auxiliary switch lever 45 with the effect of normally holding said auxiliary switch in its open position shown in Fig. II. However, said toggle spring 50 also effects snap movement of said auxiliary switch to its closed position in which the terminal 43' is in contact with the terminal 41' whenever said auxiliary switch lever 45 is tilted downwardly at its left end until the point of contact of said toggle plunger 49' with said toggle arm 45' is moved to the left of a line drawn through the centers of said pivots 46 and 49. However, the latter snap action is not effected unless and until said setback shaft 22 is turned clockwise by the operator manipulating the crank 21 and of course, counter-clockwise in Fig. II, so far that said cam 25 rides over the left hand end of said auxiliary switch lever 45 to the precise zero position of the indicator numbered wheels 12 and 13; whereupon, such snap action closes said auxiliary switch 45 to bring the movable terminal 43' in contact with the fixed terminal 41' and thereafter hold it there until said switch lever 45 is positively moved to its open position shown in Fig. II. Such opening movement is effected by the main switch lever 34 as hereinafter described.

As above noted, the indicator is not in zero position and the hook lever 29 is in the position to which it is shifted by the weight of the hose and nozzle when hung on the hook end 29' of that lever in idle position. Therefore, if the operator removes the hose and nozzle to effect a dispensing operation and by manipulation of said hook lever 29 pushes the main switch lever 34 to closed position bringing the movable terminal 42' into contact with the fixed terminal 40', such movement does not affect the position of the auxiliary switch lever 45 because the tappet plate 37 which then encounters the right hand end of the auxiliary switch lever 45 is merely tilted stressing the tappet spring 39 far enough to let said plate slip past said lever 45 in its upward movement, and the electric motor remains inoperative because the auxiliary switch remains in the open position shown in Fig. II. Said auxiliary switch 45 is not displaced by such movement of the tappet plate 37 because the spring 50 in the toggle lever 48 is stronger than the tappet spring 39. As above noted, said auxiliary switch can only be closed by turning the setback crank 21 until the indicator is in zero position. Thereupon, the energizing circuit of the motor being completed the pump will operate to dispense liquid under the control of the valve in the hose nozzle manipulated by the operator.

It may be observed that said tappet plate 37 which is rigidly supported by the main switch lever 34 in downward movement of the tappet plate serves to insure that such downward movement shall leave the auxiliary switch 45 in the open position shown in Fig. I, said tappet plate forcing said switch lever 45 downward by such movement until the right hand end of said auxiliary switch lever 45 rests upon the stationary lug 51 in said switch box 26 as shown in Fig. II.

It is to be understood that the switch mechanism shown in Fig. II is thus placed in open position as to both switches only when the hook lever 29 is depressed manually, by the weight of the hose and nozzle, or otherwise, to its lowermost position shown in the drawings which is the position in which it should be placed at the end of each dispensing operation.

It is to be understood that my invention is equally applicable to any fluid dispensing apparatus including an electric motor, indicator, and setback mechanism for the latter, regardless of whether the indicator is of the computing registering type or not.

Therefore, I do not desire to limit myself to the precise details of construction and arrangement herein set forth as it is obvious that various modifications may be made therein without departing from the essential features of my invention as defined in the appended claims.

I claim:

1. In fluid dispensing apparatus including an electric motor circuit, indicator and setback mechanism for the latter, and a movable support for a dispensing hose; a main electric switch included in the motor circuit; means operatively connecting said hose support with that switch; an auxiliary switch in said circuit, in series relation with said main switch; and means operatively connecting said auxiliary switch with said setback mechanism; whereby, said indicator must be set back to zero position to effect closure of said auxiliary switch, and both switches must be closed to energize said motor circuit before any fluid can be dispensed.

2. In fluid dispensing apparatus including an electric motor circuit, indicator and setback mechanism for the latter, and a movable support for a dispensing hose; a main electric switch included in the motor circuit; means operatively connecting said hose support with that switch; an auxiliary switch in said circuit, in series relation with said main switch; means operatively connecting said auxiliary switch with said setback mechanism; and means for operatively connecting said main switch with said auxiliary switch to open said auxiliary switch by opening movement of said main switch; whereby, said indicator must be set back to zero position to effect closure of said auxiliary switch, and both switches must be closed to energize said motor circuit before any fluid can be dispensed.

3. In fluid dispensing apparatus including an electric motor circuit, indicator and setback mechanism for the latter, and a movable support for a dispensing hose; a main electric switch included in the motor circuit; means operatively connecting said hose support with that switch; an auxiliary switch in said circuit, in series relation with said main switch; means, including a spring pressed toggle, for effecting snap action of said auxiliary switch in both its opening and closing movement; means operatively connecting said auxiliary switch with said setback mechanism; and means for operatively connecting said main switch with said auxiliary switch to open said auxiliary switch by opening movement of said main switch; whereby, said indicator must be set back to zero position to effect closure of said auxiliary switch, and both switches must be closed to energize said motor circuit before any fluid can be dispensed.

4. In fluid dispensing apparatus including an electric motor circuit, indicator and setback mechanism for the latter, and a movable support for a dispensing hose; a main electric switch in said circuit and including a lever; means operatively connecting said hose support with that switch; an auxiliary switch in said circuit, in series relation with said main switch and including a lever; means operatively connecting said auxiliary switch with said setback mechanism; two stationary terminals, and two movable terminals for contact therewith, in said circuit, said movable terminals being respectively carried by said main switch lever and by said auxiliary switch lever; whereby, said indicator must be set back to zero position to effect closure of said auxiliary switch, and both switches must be closed to energize said motor circuit before any fluid can be dispensed.

5. In fluid dispensing apparatus including an electric motor circuit, indicator and setback mechanism for the latter, and a movable support for a dispensing hose; a main electric switch in said circuit and including a lever; means operatively connecting said hose support with that switch; an auxiliary switch in said circuit, in series relation with said main switch and including a lever; means operatively connecting said auxiliary switch with said setback mechanism; and means for operatively connecting said main switch with said auxiliary switch to open said auxiliary switch by opening movement of said main switch including a tappet pivotally carried by said main switch lever and a spring stressing said tappet to operative position on that lever; whereby, said indicator must be set back to zero position to effect closure of said auxiliary switch, and both switches must be closed to energize said motor circuit before any fluid can be dispensed.

6. In fluid dispensing apparatus including an electric motor circuit, indicator and setback mechanism for the latter, and a movable support for a dispensing hose; a main electric switch included in the motor circuit; means operatively connecting said hose support with that switch; an auxiliary switch in said circuit, in series relation with said main switch; and means, including a rotary shaft and cam, operatively connecting said auxiliary switch with said setback mechanism; whereby, said indicator must be set back to zero position, with rotation of said shaft and cam, to effect closure of said auxiliary switch, and both switches must be closed to energize said motor circuit before any fluid can be dispensed.

7. In fluid dispensing apparatus including an electric motor circuit, indicator and setback mechanism for the latter, including a rotary shaft, and a hook lever support for a dispensing hose; a main electric switch included in the motor circuit; means operatively connecting said hook lever with that switch; an auxiliary switch in said circuit, in series relation with said main switch; means, including a cam on said shaft, operatively connecting said auxiliary switch with said setback mechanism; and means, including a tappet connected with said main switch lever, for operatively connecting said main switch with said auxiliary switch to open said auxiliary switch by opening movement of said main switch; whereby, said indicator must be set back to zero position with rotation of said shaft and cam, to effect closure of said auxiliary switch, and both switches must be closed to energize said motor circuit before any fluid can be dispensed.

8. In fluid dispensing apparatus including an electric motor circuit, indicator and setback mechanism for the latter, and a hook lever support for a dispensing hose; a main electric switch included in said circuit and including a lever; means operatively connecting said hose support with that switch lever; an auxiliary switch in said circuit, in series relation with said main switch and including a lever; means, including a spring pressed toggle, for effecting snap action of said auxiliary switch lever in both its opening and closing movement; means, including a rotary shaft and cam, operatively connecting said auxiliary switch lever with said setback mechanism; and means for operatively connecting said main switch lever with said auxiliary switch lever, including a tappet pivoted on said main switch lever, to open said auxiliary switch by opening movement of said main switch lever; whereby, said indicator must be set back to zero position, with rotation of said shaft and cam, to effect closure of said auxiliary switch, and both switches must be closed to energize said motor circuit before any fluid can be dispensed.

CORNELIUS A. DESIMONE.